United States Patent [19]

Handa et al.

[11] Patent Number: 4,535,131
[45] Date of Patent: Aug. 13, 1985

[54] PROCESS FOR PRODUCING PARTIALLY HYDROLYZED ACRYLAMIDE POLYMER

[75] Inventors: Ryoji Handa, Yokosuka; Jun Hosoda; Norimasa Yoshida, both of Yokohama, all of Japan

[73] Assignees: Nitto Kagaku Kabushiki Kaisha; Mitsubishi Rayon Co., Ltd.; Diafloc Co., Ltd., all of Tokyo, Japan

[21] Appl. No.: 596,102

[22] Filed: Apr. 2, 1984

[30] Foreign Application Priority Data

Apr. 4, 1983 [JP] Japan .................................. 58-59055

[51] Int. Cl.$^3$ ................................................ C08F 8/12
[52] U.S. Cl. ................................ 525/369; 525/329.4; 525/378
[58] Field of Search ................................ 525/369, 378

[56] References Cited

U.S. PATENT DOCUMENTS 3,905,122  9/1975  Ohshima et al. ........................ 34/17
4,146,690  3/1979  Tago et al. ............................. 525/367
4,192,727  3/1980  Ward ..................................... 524/789

Primary Examiner—Bernard Lipman
Attorney, Agent, or Firm—Robert E. Burns; Emmanuel J. Lobato; Bruce L. Adams

[57] ABSTRACT

Polyacrylamide in the form of aquagel is partially hydrolyzed in such a manner that small pieces of the aquagel are mixed with an alkali agent in a specified quantity and maintained at a temperature of 50° to 95° C. until the hydrolysis reaches substantial completion. The quantity of the alkali agent is that corresponding to 1/1.1 to 1/3 of the hydrolysis percentage desired of the final partially hydrolyzed polyacrylamide. The partially hydrolyzed polyacrylamide thus produced is characterized by uniform hydrolysis evidenced by its improved solubility in water and a pH around 7 of its aqueous solution. The term "aquagel" is herein used interchangeably with a term "hydrogel".

10 Claims, No Drawings

PROCESS FOR PRODUCING PARTIALLY HYDROLYZED ACRYLAMIDE POLYMER

BACKGROUND OF THE INVENTION

This invention relates to a process for hydrolyzing an acrylamide polymer, that is, a process for producing a partially hydrolyzed acrylamide polymer.

Acrylamide polymers, namely, homopolymers and copolymers of acrylamide have been widely used as flocculants or thickeners for paper making and more recently for secondary recovery of petroleum. Although the performance required of the polymer may differ depending on the respective purposes of uses, the common desirable features for these uses are most probably high molecular weight and good solubility of these polymers.

One group of such acrylamide polymers are copolymers of acrylamide with acrylic acid (or its salt) (comonomers are not necessarily limited to acrylic acid alone). One method for obtaining such a copolymer comprises hydrolyzing with an alkali agent a part of the amide groups by contacting an acrylamide polymer in the state of an aquagel obtained from the polymerization step. For example, the following proposals have been made: (1) a gel-like polymer is kneaded with an alkali agent by means of a rotary screw type extruder, and the kneaded mixture is dried according to necessity. (reference: Japanese Patent Publication No. 17668/1974); (2) granules of a gel-like polymer are contacted with an aqueous alkali, further subjected to regranulation by means of a granulating extruder and then dried. (reference: Japanese Laid-open Patent Publication No. 167705/1981); and (3) hydrous polymer particles are contacted with an alkali agent under agitation in a device equipped with a stirring mechanism with a ribbon type blade or a gate type blade whose surface to be in contact with the polymer particles is made of a synthetic resin, which step is followed subsequently by drying under heating (reference: Japanese Patent Publication No. 15793/1979).

All of these methods provide methods for mixing a gel-like polymer with an alkali agent and have successfully achieved their respective objects. To the best of our knowledge, however, these methods involve problems. That is, the methods (1) and (2) may be considered to be superior to the method (3) in the aspect of achieving uniform hydrolysis, but a lowering of the molecular weight of the polymer is unavoidable because of a great shearing force acting on the polymer in the presence of an alkali agent. On the other hand, according to the method of (3), while deterioration of the polymer is suppressed to some extent, it is not yet satisfactory with respect to carrying out hydrolysis uniformly. When uniform hydrolysis is not accomplished, various problems arise depending on the uses of the polymers obtained, even though the polymer may have a high molecular weight and good solubility. For example, when applied as a thickener for paper making, the pulp may undergo partial agglomeration to cause poor formation of the paper, sometimes resulting in failure of paper making in extreme cases. Also, when applied as an agent for secondary recovery of petroleum, white turbidity may be generated in water containing polyvalent metal ions to lower the function of the agent.

Still another disadvantage of the method for hydrolysis of the aquagel of an acrylamide polymer as described above is that, since a considerable part of the hydrolysis reaction is accomplished in the drying step, the by-produced ammonia is occluded in dried polymer particles, which ammonia is in turn released upon dissolution of the dried particles, whereby the working environment is impaired as a consequence of the generation of the odor of ammonia. In view of such a drawback, various proposals have also been made to use various additives (reference: Japanese Laid-open Patent Publication Nos. 102390–102392/1979).

SUMMARY OF THE INVENTION

An object of the present invention is to overcome the drawbacks of the prior art as described above, and the present invention seeks to accomplish this object by carrying out hydrolysis of an aquagel polymer according to a specific mode and at the same time completing the hydrolysis before the drying step.

More specifically, the process for producing a partially hydrolyzed acrylamide polymer according to this invention comprises mixing small pieces of the aquagel of an acrylamide polymer with an alkali agent and then drying the mixture thereby to produce a partially hydrolyzed acrylamide polymer, wherein the small pieces of the aquagel are mixed with the alkali agent and maintained at a temperature of 50° to 95° C. for a time until hydrolysis is accomplished to a degree of 1.1 to 3 times the theoretical hydrolysis percentage corresponding to the amount of the alkali agent mixed, hydrolysis being substantially completed, and thereafter the small pieces of the aquagel are dried.

The present invention has been attained as the result of our various investigations on various parameters such as the quantity of the alkali agent adhering to the aquagel surface, the rate of diffusion of the alkali agent into the aquagel, the secondary hydrolysis caused by the ammonia which is a by-product, etc.

According to the present invention as specified above, hydrolysis can be accomplished uniformly under application of substantially no shearing force on the aquagel of the polymer, whereby the solubility of the resultant polymer can be markedly improved as compared with the products obtained by the methods of the prior art. As another advantage, substantially no occlusion of ammonia within the dried polymer particles is observed.

DETAILED DESCRIPTION OF THE INVENTION

Aquagel of acrylamide polymer

The aquagel of the acrylamide polymer to be subjected to hydrolysis is essentially not different from those used in the prior art as described above.

Thus, first, as the acrylamide polymer, in addition to typical acrylamide homopolymers, there can be copolymers of a major proportion, preferably 80 mole %, of acrylamide and a minor proportion of a comonomer copolymerizable therewith. Since this polymer should be soluble in water, the comonomer employed should be chosen so that the resultant copolymer at a given composition will be soluble in water. Examples of such comonomers are (meth)acrylic acid or esters and salts thereof, acrylonitrile, hydroxyethyl (meth)acrylate, 2-acrylamido-2-methylpropane sulfonic acid and salts thereof. Here, "(meth)acrylic acid" means both acrylic acid and methacrylic acid.

From the requirement as stated above that the acrylamide polymer should have a high molecular weight, the aquagel has almost no fluidity but has a certain extent of "solidness". The "solidness" of the aquagel of course depends on the molecular weight and the concentration of the polymer dissolved therein. In view of its ease in handling, it is desired that the aquagel have ample solidness, and, specifically, for example, in the case of an acrylamide homopolymer having an average molecular weight of about 5,000,000, the "solidness" of the aquagel when containing the polymer at a concentration of at least 15% by weight is suitable.

Such an acrylamide aquagel is ordinarily prepared by polymerization of a required monomer in an aqueous solution. Since it is the common practice to utilize the polymer solution formed with 100% of polymerization conversion directly as it is for the aquagel, the monomer concentration during the polymerization in an aqueous solution is substantially the same as the polymer concentration in the aquagel. More specifically, the monomer concentration is of the order of from 15 to 40%, preferably 20 to 35%, by weight. The kind and quantity of the catalyst should be appropriately selected with due consideration of the nature of the polymerization system wherein a high molecular weight polymer is produced with a conversion of 100%, whereby it is impossible to agitate the system, and, therefore, the rise in temperature of the system due to the heat of polymerization must be unpreventably left to occur. Specific examples are redox initiators and azo initiators.

The present invention is directed toward the preparation of small pieces of such an acrylamide polymer aquagel. Such small pieces can be obtained by roughly crushing the mass of the aquagel and further grinding the crushed product into pieces. For grinding into small pieces, it is convenient to use an extruder like a meat grinder, that is, a meat grinder having a rotary cutter in contact with the inner side of a perforated plate. The perforated plate to be used in this case has orifices of a diameter of the order of 3 to 20 mm, preferably of the order of 5 to 10 mm. The small pieces of aquagel are obtained as pellets or stubs with diameters of the same order or deformations thereof.

Hydrolysis step

The small pieces of the acrylamide polymer aquagel thus obtained are mixed with an alkali agent and hydrolyzed under specific conditions.

The alkali agent may be any compound which can cause the desired hydrolysis in the acrylamide polymer, but most typically a hydroxide of an alkali metal, particularly sodium hydroxide.

The alkali agent is ordinarily in the form of an aqueous solution so as to be contacted evenly with the small pieces of aquagel, and mixing of the alkali agent with the small pieces of aquagel is generally practiced by spraying of the aqueous solution over the small pieces. This aqueous solution may also contain auxiliary materials such as antioxidants and others dissolved therein depending on the necessity. The aqueous solution of an alkali agent desirably has a high concentration from the standpoint of drying load, while a low concentration is desirable from the standpoint of homogeneous dispersion and spraying load. Generally, however, it is of the order of 20 to 40%. It is preferable to use an aqueous solution at such a concentration and warmed to about 50° to 70° C.

One specific feature of the present invention resides in the use of an alkali agent in an amount within a specific range and also substantially completing hydrolysis before drying with the use of such an amount of the alkali agent.

More specifically, the theoretical hydrolysis percentage in the case of hydrolysis of an acrylamide polymer with an alkali agent [namely, {(moles of amide groups hydrolyzed)/(moles of amide groups before hydrolysis)}(×100)] is the same as the quantity in mole percentage of the alkali agent employed [namely, {(moles of the alkali agent employed/(moles of amide groups before hydrolysis)}(×100)]. In actual practice, however, the hydrolysis percentage attained is generally smaller than the theoretical hydrolysis percentage corresponding to the amount of the alkali agent employed. The present invention has been attained, in the first place, as a result of our perceptively observing this hydrolysis behavior and thereupon carrying out the various investigations as mentioned hereinbefore. The hydrolysis step is carried out so that the hydrolysis percentage will be 1.1 to 3 times, preferably 1.5 to 2.0 times the theoretical hydrolysis percentage corresponding to the amount of the alkali agent employed. To attain a hydrolysis percentage 1.1 to 3 times the theoretical hydrolysis percentage corresponding to the amount of the alkali agent employed means to use an alkali agent in an amount corresponding to 1/1.1 to ⅓ of the desired hydrolysis percentage, which desired hydrolysis percentage is that desired in the final product since hydrolysis is substantially completed in the hydrolysis step in the present invention.

In the present invention, moreover, this hydrolysis step is substantially completed prior to the drying step. For this purpose, the small pieces of aquagel and the alkali agent are mixed together and maintained at a temperature within a specified range, namely, from 50° to 95° C., preferably from 60° to 80° C., for a certain period of time. The maintenance time in this case is the time until the state wherein hydrolysis is substantially completed is attained. The "state where hydrolysis is substantially completed" as herein mentioned means that the increase in the hydrolysis percentage after drying is not greater by about 5%, preferably about 2% based on that before drying.

The maintenance time differs depending on the temperature employed. For example, at the same level of the alkali agent, 8 hours are necessary at 70° C., while about 15 hours of maintenance time are required at 60° C. Since the temperature of the polymer aquagel to be prepared in this invention is permitted to rise freely during adiabatic polymerization in an aqueous solution, it is sometimes found that the aquagel produced has a temperature of 90° C. or higher upon completion of polymerization. Even after this gel is disintegrated into pieces, the temperature of the pieces is still at approximately 70°-80° C. and therefore it is advantageous with respect to energy saving to carry out the hydrolysis step with addition of an alkali agent at a temperature of the order of 60° to 80° C. At a temperature higher than 95° C., the hydrolysis rate is so great that hydrolysis will proceed under the state where the alkali agent is insufficiently diffused in the small pieces of gel to give locally ununiform hydrolysis percentages within the given piece of gel.

Drying step

Except for carrying out the hydrolysis step under the controlled conditions as described above, the drying step in the present invention is substantially the same as that employed in the prior art as described above.

Thus, it is possible to use any of box type drier, rotary drier and belt type drier conventionally used, and the small pieces of the polymer after drying is pulverized in a conventional manner into powder.

EXPERIMENTAL EXAMPLES

Example 1

After an aqueous solution containing 25% by weight of acrylamide was thoroughly purged with nitrogen, polymerization was carried out in a conventional manner by the use of a redox initiator at 10° C. to obtain a rubbery polymer gel.

Twenty kilograms (20 kg) of this gel was minced into small pieces by means of an extruder resembling a meat grinder having a perforated plate with orifice size of 6 mm equipped internally with a cutter. The temperature of the small pieces of gel was 78° C. on the average. These pieces were charged into a drum granulator of a ca. 250 liter capacity, and 1,020 g of an aqueous 30% caustic soda solution (10 mole % of the acrylamide units in the gel) heated to 50° C. was sprayed thereover while the drum was rotated. The small pieces were then transferred into a vessel traced with hot water, and the temperature thereof was measured and found to be 65° C. on the average. The same temperature was maintained with the lid kept closed for 12 hours. A part of the treated small pieces of gel was sampled, and the remainder was dried in a 100-liter hot air rotary drier at 120° C. for 20 minutes, and then at 60° C. for 5 hours. The polymer pellets obtained were crushed and measured for solubility (Note 1), microgel (Note 2) and uniformity of hydrolysis (Note 3). A part of the 1% solution was sampled for measurement of hydrolysis percentage. The results were as shown below.

Hydrolysis percentage: 20.5 mole %
Solubility: 0%
Microgel: ±
Uniformity of hydrolysis: Slight white turbidity
pH of 1% solution: 7.1

The hydrolysis percentage of the small pieces of gel sampled before drying was found to be 20.3%, the increase in the hydrolysis percentage by drying being thus 0.98%.

Comparative Example 1

The aqueous caustic soda solution was sprayed in the same manner as in Example 1 and the mass was thereafter maintained as it was for 30 minutes. A part of the mass was sampled and the remainder was dried according to the same method as in Example 1. This polymer was evaluated similarly as in Example 1. The results were as shown below.

Hydrolysis percentage: 9.8 mole %
Solubility: 0.2%
Microgel: ++
Uniformity of hydrolysis: Slight white turbidity (with transparency)
pH: 10.0
Hydrolysis percentage of the gel before drying: 7.5 mole % (hydrolysis percentage is increased by 31% by drying)

Comparative Example 2

Comparative Example 1 was repeated except that the amount of the caustic soda added was changed to 2,040 g (20 mole % of the acrylamide units in the gel), and the polymer was evaluated similarly. The results are as shown below.

Hydrolysis percentage: 20.1 mole %
Solubility: 0.2%
Microgel: +++
Uniformity of hydrolysis: White turbidity (with no transparency whatsoever)
pH: 10.5
Hydrolysis percentage of the gel before drying: 16 mole % (hydrolysis percentage is increased by 26% by drying)

As is apparent from Example 1, Comparative Example 1 and Comparative Example 2, the process of the present invention can provide a product which is superior in both solubility and uniformity of hydrolysis as compared with the products of the hydrolysis methods proposed in the prior art, and which, in a 1.0-% solution, exhibits a pH which is not high, there being no existence whatsoever of unreacted alkali, ammonia, etc.

Examples 2-6 and Comparative Examples 3-5

After small pieces of gel were obtained according to the procedure of Example 1, about 200 g of the small pieces of gel were accurately weighed in a polyethylene bag, and hydrolysis was conducted with various amounts of alkali added and for various periods of maintenance time to obtain various hydrolyzed polymer powders. The polymers were evaluated similarly as in Example 1 to obtain the results as shown in the following Table.

|  | Hydrolysis Conditions | | | Hydrolysis Percentage (%) | | Solubility (%) | Microgel | (Note 4) | |
|---|---|---|---|---|---|---|---|---|---|
|  | Alkali added (mol %) | Temperature (°C.) | Maintenance time | Before drying | After drying |  |  | pH | Uniformity |
| Example | | | | | | | | | |
| 2 | 5 | 80 | 8 hrs. | 9.5 | 9.7 | 0 | + | 7.1 | Substantially no turbidity |
| 3 | 15 | 70 | 16 | 26.0 | 26.2 | 0 | ± | 7.2 | Slight white turbidity (with transparency) |
| 4 | 20 | 70 | 15 | 29.6 | 30.0 | 0 | ± | 7.3 | — |
| 5 | 20 | 80 | 8 | 30.8 | 30.7 | 0 | ± | 7.3 | — |
| 6 | 10 | 75 | 8 | 19.2 | 19.6 | 0 | ± | 7.3 | Slight white turbidity (with transparency) |
| Comparative Example | | | | | | | | | |
| 3 | 20 | 70 | 30 min. | 14.0 | 20.0 | 0.2 | ++ | 10.8 | Great white turbidity (with no transparency) |
| 4 | 20 | 98 | 15 min. | 15.2 | 20.0 | 0.3 | +++ | 9.8 | Great white turbidity (with no transparency) |

-continued

| | Hydrolysis Conditions | | | Hydrolysis Percentage (%) | | Solubility (%) | Microgel | (Note 4) | |
|---|---|---|---|---|---|---|---|---|---|
| | Alkali added (mol %) | Temperature (°C.) | Maintenance time | Before drying | After drying | | | pH | Uniformity |
| 5 | 30 | 70 | 15 min. | 19.5 | 29.5 | 0.1 | ++ | 11.0 | — |

(Note 1) Solubility:
The test was conducted at a water temperature of 23 ± 1° C. Solubility was measured as follows. One half (0.5) gram of polymer powder was weighed into a glass beaker containing 500 ml of tap water and stirred for 4 hours. The mixture was transferred onto a 100-mesh screen and left to stand thereon for about 5 minutes. The residue on the screen was collected and dried, and its proportion was represented in terms of percentage.

(Note 2) Microgel:
Even in the above method, some microgels which can pass through the 100-mesh screen may sometimes exist. This was measured by observing a piece of glass plate ($25^{mm} \times 75^{mm} \times 1^{mm}$) dipped in and withdrawn from the polymer solution, its quantity (numbers of swollen microgel particles) observed being rated according to the following ranking.
+++: markedly much
++: much
+: slight
±: almost none (Note 3) Irregularity of hydrolysis (uniformity):
Five (5) grams of powder polymer was transferred into a beaker containing 500 ml of deionized water, and, after stirring for 4 hours, $2N-H_2SO_4$ was added thereinto to adjust pH to 2.2. After additional stirring for 60 minutes, the white turbid state is observed. The degree of white turbidity depends greatly on the temperature and the hydrolysis percentage, and therefore particular caution is necessary for samples to be compared. When hydrolysis proceeds to 35 mole % or higher on an average or when hydrolysis irregularity becomes greater, precipitates of a polymer may sometimes be formed. In such a case, comparison should be made by changing the measuring conditions such as elevation of temperature.

(Note 4) pH of 1.0% solution:
Determination of the pH of the above 1.0% solution shows the presence of unreacted alkali or $NH_3$ formed during drying.

What is claimed is:

1. In a process for producing a partially hydrolyzed acrylamide polymer which comprises mixing small pieces of the aquagel of an acrylamide polymer with an alkali agent and then drying the mixture thereby to produce a partially hydrolyzed acrylamide polymer, the improvement comprising maintaining said small pieces of the aquagel mixed with said alkali agent at a temperature of 50° to 95° C. for a time sufficient to effect hydrolysis to a degree of 1.1 to 3 times the theoretical hydrolysis percentage corresponding to the amount of the alkali agent mixed and until the hydrolysis is substantially completed, and thereafter drying said small pieces of the aquagel.

2. The process as claimed in claim 1 in which the acrylamide polymer is selected from the group consisting of homopolymer of acrylamide and water-soluble copolymers of a major proportion of acrylamide and a minor proportion of a comonomer copolymerized therewith.

3. The process as claimed in claim 1 in which the aquagel has a solidness which is equivalent to that of an aqueous solution of a homopolymer of acrylamide of an average molecular weight of approximately 5,000,000 in a concentration of at least 15 % by weight.

4. The process as claimed in claim 1 in which the small pieces of the aquagel are prepared by extruding the aquagel through die orifices of a diameter of 3 to 20 mm and cutting the extrudate.

5. The process as claimed in claim 1 in which the alkali agent is in the form of an aqueous solution of a concentration of 20 to 40 % by weight.

6. The process as claimed in claim 1 in which the increase in the percentage of hydrolysis as a result of drying is not greater than about 5%, based on the percent hydrolysis before drying.

7. The process as claimed in claim 1 in which the increase in the percentage of hydrolysis as a result of drying is not greater than about 2%, based on the percent hydrolysis before drying.

8. The process as claimed in claim 1 in which said small pieces of aquagel mixed with said alkali agent are maintained at a temperature of about 60° to 80° C.

9. The process as claimed in claim 1 in which said small pieces of aquagel mixed with said alkali agent are maintained at said temperature for a time sufficient to effect hydrolysis to a degree of 1.5 to 2.0 times the theoretical hydrolysis percentage corresponding to the amount of the alkali agent.

10. The process as claimed in claim 1 in which about 91 to 33% of the theoretical stoichiometric amount of alkali based on the amount of hydrolysis to be effected is mixed with said aquagel.

* * * * *